No. 827,517. PATENTED JULY 31, 1906.
C. ELLIS.
PROCESS OF BURNING CEMENT CLINKER BY FLAME IMPINGEMENT
AND APPARATUS THEREFOR.
APPLICATION FILED DEC. 28, 1905.
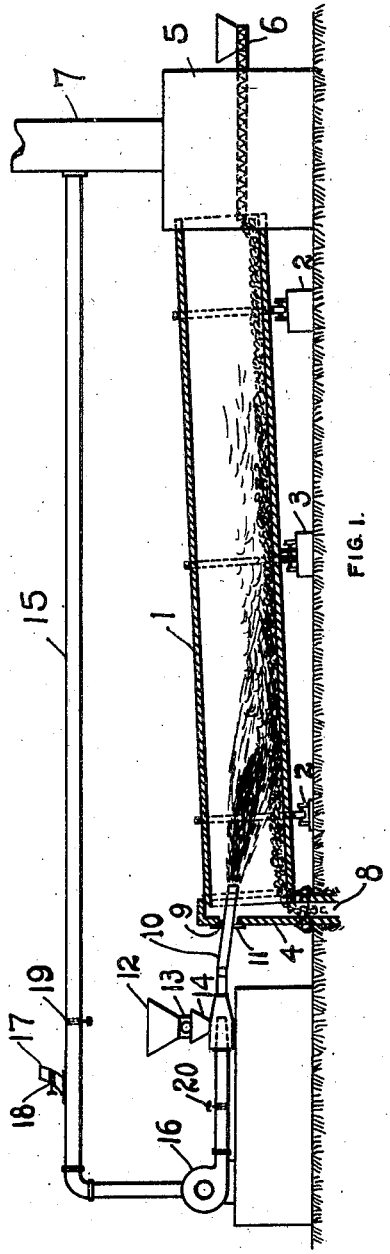
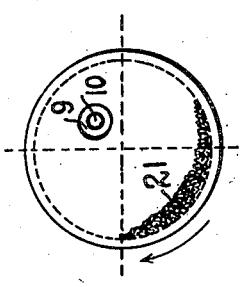
Witnesses
Inventor

UNITED STATES PATENT OFFICE.

CARLETON ELLIS, OF WHITE PLAINS, NEW YORK.

PROCESS OF BURNING CEMENT CLINKER BY FLAME IMPINGEMENT AND APPARATUS THEREFOR.

No. 827,517.  Specification of Letters Patent.  Patented July 31, 1906.

Application filed December 28, 1905. Serial No. 293,687.

*To all whom it may concern:*

Be it known that I, CARLETON ELLIS, a citizen of the United States, and a resident of White Plains, in the county of Westchester and State of New York, have invented certain new and useful Processes of Burning Cement Clinker by Flame Impingement and Apparatus Therefor, of which the following is a specification.

This invention relates to the making of Portland cement, which in the best modern practice is burned in rotary or barrel kilns by means of a blast-flame of powdered coal projected from one end of the kiln in heating relation to a continuous stream of the material fed along the floor of the barrel. These instrumentalities I am able to utilize in a new manner with improved results with respect to the consumption of the fuel, quality of the product, and durability of the apparatus.

The powdered-fuel blast has hitherto been used with certain objectionable limitations, due principally to the extremely high temperatures attained and the difficulty of regulating the combustion. Thus although this method has the advantage of affording a strong flame at a long distance from the root of combustion it is also attended with the disadvantage, among others, of overheating, rapid deterioration of linings, inflexibility, and waste of fuel. In burning cement in rotary kilns with the powdered-coal blast it has become customary to employ a long axial flame which is preserved from extensive contact with the material and lining by a stratum or envelop of air, an expedient which has the effect of protecting the lining and material to some extent from the intense heat of the flame, but which results in a waste of heat, which I am able to reduce. The application of the heat in this manner is necessarily irregular, and the cement material discharges from the kiln as a mixture of burned and overburned clinker, provided the flame is sufficiently powerful with respect to the rate of progression of the cement stream to not discharge underburned clinker. In other words, it is not possible by the present method of application to secure uniformly burned clinker. While the overburned clinker which is produced does no great harm to the finished cement, yet its hardness causes grinding to be difficult and expensive, and the imperfect application of the fuel resulting in a portion of the cement being overburned is a source of fuel loss.

My invention, among other things, aims to secure the benefits of the long blast-flame in cement-burning without incurring the aforesaid difficulties, and this I do by employing a predetermined volume of diluent, such as products of combustion, in the blast-current, which modifies the flame and reduces its temperature, rendering it longer, more slowly burning, and voluminous. Such a flame is found to be hot enough for effective action and cool enough to be allowed to impinge directly on the lining or the material without undue injurious effect upon either.

In the combustion of the powdered coal burning axially in the kiln high flame temperatures are developed. These I have found to approach 3,000° Fahrenheit. A flame of this temperature impinging upon the lining of the kiln would rapidly destroy it, for as the lining softens the forming clinker passing thereover as the kiln rotates must rapidly abrade said lining.

The coal which is used in the jet is finely ground, and ordinarily ninety per cent. will pass through a one-hundred-mesh sieve. With axially-injected flames in the prior art it has been found that coarse particles of coal are frequently blown into the kiln for considerable distances. There is also a tendency for coal particles to fall out of the stream in the front part of the kiln on the clinker, discoloring it, and in some cases burning there with sufficient heat to give an overheat to this end of the kiln. This is particularly the case where natural draft currents through the kiln are relied upon to afford part of the air necessary for combustion as the incoming heated air passes directly over such coal particles.

My invention has principally for its object the overcoming of these difficulties and the injection of the coal in such manner as to burn it in the region desired.

For the performance of the process herein set forth and claimed I have devised a certain novel combination of apparatus, which apparatus is also claimed herein.

In the accompanying drawings, Figure 1 of which represents a sectional view of a cement-kiln, 1 is the inclined rotatable barrel lined with refractory material rotating on the rollers 2 and operated by the gear mechanism 3. 4 is a hood inclosing the lower end of the kiln. 5 is a housing into which the upper end of the kiln projects, which housing is provided with a feed-conveyer 6 for the introduction of the raw material and is also provided with the stack 7. In the hood 4 is the outlet 8 for the finished clinker. In the hood and preferably well above the center line or axis of the kiln is situated the opening 9, into which projects the blast-pipe 10, the annular space surrounding which is inclosed by the adjustable plate 11, which is so constructed that the blast-pipe 10 may be moved in any direction in order to shift the direction of the blast, the flame of which should impinge at a point about ten to twelve feet from the clinker-discharge end of the kiln. 12 is a fuel-hopper containing powdered coal. 13 is a conveyer discharging the coal in a predetermined stream into the hopper and induction-chamber 14. 15 is a conduit or pipe extending from the stack 7 to the induction-chamber 14. Interposed in this conduit is the fan-blower 16 or other mechanical draft appliance. On the suction side of the fan-blower is situated the air-inlet 17. Dampers 18 and 19 govern the flow of air and stack-gases, respectively, and permit of admixture of ninety-two per cent. of the former with eight per cent. of the latter, which is a mixture well suited for the purposes of my invention. 20 is a damper placed on the pressure side of the fan.

In Fig. 2, which is a cross-section of kiln near its lower end, the disposition of cement material on the floor of the kiln is shown. It will be seen that the rotation of the kiln causes the material to pile up on the left-hand side, the motion of the kiln in this case being in the direction of the hands of a clock. In Fig. 2 the preferred location of the opening 9 of the blast-pipe 10 is shown. In ordinary practice the feed-pipe is entered at some point below the center in the lower left-hand quadrant of the kiln-section and is directed into the kiln-barrel along its axis in such a manner that no impingement of the flame occurs. My invention involves the elevation of the blast-pipe to a much higher point in the kiln above the axis and with a downward inclination such that the flame positively impinges upon the material and with a force sufficient to penetrate any stratum of air which may be drawn in through the openings at the hood. It is evident that the application of the flame in this manner with a powdered coal and air blast would result in the rapid destruction of the kiln-lining, beside overburning the material to a greater of less extent in the endeavor to secure the complete burning of all the material. By the use of a regulated amount of stack-gases or steam in admixture with the air-blast the flame is so tempered that no destructive action upon the kiln-linings is experienced. Although steam is not a permanent gas, and although it often exhibits a catalyzing or accelerating effect on combustion, yet in the present instance it is sometimes possible to use steam or water-vapor in regulated amount for cooling the flame to an impinging temperature. The temperature of the flame is lowered by the use of burned gases, and while such a flame for clinkering purposes would not be practical as an axial flame because of its lower temperature, yet as an impinging-flame, owing to its proximity to the material, it is just as effective as an axial flame of higher temperature heating the material at a distance by radiation only. It is of course not possible to have every portion of the flame impinge upon the material; but the flame is prevented from taking an axial course by the downward inclination of the jet and the major portion thereof impinges upon the material. By this process combustion occurs in and around the material, and is therefore conducted under conditions of highest efficiency. Elevation of the jet to a point above the center of the kiln results in overcoming the difficulties heretofore experienced with the impinging-flame—namely, those due to the falling of the heavier particles of coal-dust prematurely in their course.

It should be observed that the stack-gas used as a diluent is not always of the same composition, and care should be taken that sufficient carbon dioxid be used in the blast to properly protect the lining of the kiln.

By diluting the air of the jet with the endothermically acting bodies named it is possible to temper the heat of a coal-flame sufficiently to permit direct impingement of said flame upon the cement material. The heat afforded, while sufficiently high to institute clinkering of the cement materials, is still not great enough to damage kiln-linings, as would be the case with a jet of coal-dust carried by enough pure air to burn it. The impingement is effected about ten or twelve feet from the end of the kiln or about where clinkering begins, and by injecting the flame from above the axis in the front end of the kiln to this point it is found that coal-dust does not drop out of the flame, as it is apt to do with an axial flame unless high jet velocities are employed, and time is given the flame to burn sufficiently throughout its mass to preclude deposition of injurious quantities of coal upon the advancing cement material. The clinkering reaction absorbing little heat, although requiring a high temperature to institute it, it is found that it goes on behind the flame and is completed by the time the clinker-outlet is reached. The current of hot gases sweeping over the stream of cement material approaching this clinkering-point gives the necessary conditions for calcining.

What I claim is—

1. The process of burning cement clinker which consists in mingling predetermined proportions of air and burned-out products of combustion, in admixing therewith a suitable proportion of powdered fuel, in injecting the mixture into a rotary cement-kiln above the axis of said kiln, transversely thereto and into direct impingement on the cement material, and in feeding material past said point of direct impingement.

2. The process of burning cement clinker in rotary kilns which consists in directly impinging on an advancing stream of cement material in such kilns at or near the zone where clinkering normally begins, a flame of burning fuel carried by a jet of commingled air and tempering-gas, the proportion of such tempering-gas in the jet being regulated to confine the temperature produced within the upper and lower limits of safe clinkering.

3. The process of burning cement in rotary kilns which consists in directly impinging on an advancing stream of cement material in such kilns at or near the zone where clinkering normally begins, a burning jet of mingled air and powdered fuel tempered by an admixture of products of combustion, the relative proportion of such products of combustion being regulated to confine the temperature produced within the upper and lower limits of effective and safe clinkering.

4. The process of burning cement clinker which consists in creating a tempered flame of clinkering temperature by combustion of powdered coal in an atmosphere diluted with inert gases, the amount of said inert gases being sufficient to restrict the temperature within the upper and lower limits of effective and safe clinkering, in impinging said flame directly upon a flattened stream of cement-forming material, in agitating said material while under treatment, and in removing said material upon transformation into clinker.

5. An apparatus for burning cement clinker comprising an inclined rotary kiln having means in its upper end for the introduction of cement-forming material and a discharge in its lower part for the exit of the finished clinker; a sealing-hood inclosing the lower end of the kiln and provided with a downwardly-directed blast-pipe at a point above the axis of the kiln, and means for introducing through said blast-pipe a mixture of powdered fuel, products of combustion and sufficient air for the combustion of said fuel.

6. An apparatus for burning cement clinker comprising a long inclined rotary kiln having means for the introduction of raw material at the upper end and an exit for the finished clinker at the lower end, means at the lower end for introducing a blast of powdered fuel and a suitable supporter of combustion, means for excluding air elsewhere and means for directing said blast downwardly across the axis of the kiln and into direct impingement upon material traversing the kiln.

7. An apparatus for burning cement clinker comprising a long inclined rotary kiln having means for the introduction of raw material into the upper end and an exit for finished clinker at the lower end; means at the lower end for the introduction of a blast of powdered fuel, air and diluent gas, all in predetermined proportions; and means for directing said blast downwardly across the axis of the kiln and into direct impingement with material traversing the kiln.

8. An apparatus for burning cement clinker comprising a long inclined rotary kiln having means for the introduction of raw material at the upper end and an exit for finished clinker at the lower end, means at the lower end for the introduction of a blast of powdered fuel, air and stack gas, all in predetermined proportions, and means for directing said blast downwardly across the axis of the kiln and into direct impingement with material traversing the kiln.

9. An apparatus for burning cement clinker comprising a long inclined rotary kiln having means for the introduction of raw material at the upper end and an exit for finished clinker at the lower end, and flame-producing means therefor comprising a burner arranged to direct a flame into direct impingement upon the material traversing said kiln, a feed device supplying said burner with powdered fuel, an air-supplying means for transporting said fuel to and through the burner and means for diluting the air supplied with sufficient inert gas to temper the flame within safe clinkering limits.

Signed at New York, in the county of New York and State of New York, this 26th day of December, A. D. 1905.

CARLETON ELLIS.

Witnesses:
 FLETCHER P. SCOFIELD,
 FRED I. SMITH.